United States Patent
Schmalzriedt

(10) Patent No.: US 10,096,850 B2
(45) Date of Patent: Oct. 9, 2018

(54) METHOD FOR STARTING THE NORMAL OPERATION

(71) Applicant: Daimler AG, Stuttgart (DE)

(72) Inventor: Sven Schmalzriedt, Esslingen (DE)

(73) Assignee: Daimler AG, Stuttgart (DE)

( * ) Notice: Subject to any disclaimer, the term of this patent is extended or adjusted under 35 U.S.C. 154(b) by 61 days.

(21) Appl. No.: 15/301,925

(22) PCT Filed: Mar. 24, 2015

(86) PCT No.: PCT/EP2015/000629
§ 371 (c)(1),
(2) Date: Oct. 4, 2016

(87) PCT Pub. No.: WO2015/154852
PCT Pub. Date: Oct. 15, 2015

(65) Prior Publication Data
US 2017/0187055 A1    Jun. 29, 2017

(30) Foreign Application Priority Data
Apr. 10, 2014 (DE) .................... 10 2014 005 296

(51) Int. Cl.
*H01M 8/04302* (2016.01)
*H01M 8/04955* (2016.01)
(Continued)

(52) U.S. Cl.
CPC ..... *H01M 8/04302* (2016.02); *B60L 11/1803* (2013.01); *B60L 11/1883* (2013.01);
(Continued)

(58) Field of Classification Search
CPC combination set(s) only.
See application file for complete search history.

(56) References Cited

U.S. PATENT DOCUMENTS

| 6,577,026 B1 | 6/2003 | Faller et al. |
| 2009/0068520 A1 | 3/2009 | Wake et al. |

(Continued)

FOREIGN PATENT DOCUMENTS

| JP | 2008-17598 A | 1/2008 |
| JP | 2009-26736 A | 2/2009 |

(Continued)

OTHER PUBLICATIONS

PCT/EP2015/000629, International Search Report dated Jun. 1, 2015 (Three (3) pages).

(Continued)

*Primary Examiner* — Carlos Barcena
(74) *Attorney, Agent, or Firm* — Crowell & Moring LLP

(57) ABSTRACT

A method for starting the normal operation of an electrical system with a fuel cell and a transducer from a stop mode is disclosed. The transducer absorbs the electrical power of the fuel cell, in which at least one reactant supply of the fuel cell was interrupted, where the interrupted reactant supply is resumed from a restart signal, and where a fuel cell voltage is prescribed and then regulated by the transducer. The prescribed fuel cell voltage is prescribed in a way that an electrical unloaded fuel cell supplied with reactants will exceed the prescribed fuel cell voltage in every case, and the current of the transducer necessary for maintaining the prescribed fuel cell voltage is measured, where the normal operation is released as of a prescribed current necessary to that effect.

8 Claims, 1 Drawing Sheet

(51) Int. Cl.
*H01M 8/04858* (2016.01)
*H01M 8/04746* (2016.01)
*B60L 11/18* (2006.01)

(52) U.S. Cl.
CPC ....... *B60L 11/1885* (2013.01); *H01M 8/0488* (2013.01); *H01M 8/0491* (2013.01); *H01M 8/04753* (2013.01); *H01M 8/04955* (2013.01); *B60L 2210/10* (2013.01); *B60L 2210/40* (2013.01); *H01M 2250/20* (2013.01)

(56) References Cited

U.S. PATENT DOCUMENTS

| | | |
|---|---|---|
| 2010/0003551 A1 | 1/2010 | Schempp et al. |
| 2010/0055521 A1 | 3/2010 | Umayahara et al. |
| 2010/0266916 A1 | 10/2010 | Imanishi et al. |
| 2012/0141895 A1 | 6/2012 | Kwon et al. |

FOREIGN PATENT DOCUMENTS

| | | |
|---|---|---|
| JP | 2009-231223 A | 10/2009 |
| JP | 2013-105635 A | 5/2013 |
| WO | WO 2008/004564 A1 | 1/2008 |

OTHER PUBLICATIONS

Japanese Notification of Reason for Refusal issued in Japanese counterpart application No. 2016-560929 dated Oct. 10, 2017, with partial English translation (Five (5) pages).

METHOD FOR STARTING THE NORMAL OPERATION

BACKGROUND AND SUMMARY OF THE INVENTION

The invention concerns a method for starting the normal operation of an electrical system with a fuel cell and a converter receiving the electrical power of the fuel cell.

With fuel cell systems, in particular with fuel cell systems, which can be used to provide electrical driving power in vehicles, a so-called start-stop operation is meaningful, similarly to vehicles with combustion engines in the meantime. It means that in case when the vehicle needs no or very little electrical power, the fuel cell system changes to an idle mode or a switched-off operation, so-called stop mode, so as to re-start in normal operation, if again a matching quantity of power is necessary. Typically, the air supply to the fuel cell is stopped in stop mode, so that the residual oxygen reacts in the fuel cell with the hydrogen typically supplied at lower level, so that the voltage of the fuel cell drops to zero after a certain period of time. Before the fuel cell can again deliver power in its entirety after leaving the stop mode, it must first of all be supplied with air or oxygen again. Only then, the full power can be required by the fuel cell. In other words, normal operation of the fuel cell is only possible once all the conditions necessary to that end are met.

It is now usual from the state of the art to provide certain waiting times, which are necessary according to certain parameters after starting the air supply until it is possible to change into normal operation without causing voltage interruption further to premature and excessive power requirements.

Additionally or alternately thereto, further operation parameters, such as for example cathode pressure or air mass flow are monitored in the general state of the art, to influence the waiting time. The shortcoming of this possibility then consists in that the observed criteria are partially costly and unreliable to observe and to measure, that they only constitute partial factors in terms of stressability of the fuel cell, and that they however do not examine the load capacity itself. It may happen that the corresponding criteria are admittedly met, but the fuel cells are still not stressable. The result is an extremely undesirable voltage interruption, when power is required by the electrical system.

Document US 2012/0141895 A1 handles the problem to know as of when a fuel cell which again in normal operation can be loaded completely, after the system has re-started from a stop mode. To do so, the voltage of the fuel via a converter connected to the fuel cell, in such a case a DC/DC-converter, is maintained at a preset voltage level. In the meantime, the condition of the fuel cell system is monitored continuously and observed to that effect to know whether the monitored parameters stabilize themselves. The monitored parameters can be for example voltages and the supplied volume flow rate of air. If all the values have stabilized themselves accordingly, it is assumed that the fuel cell is again stressable and the normal operation is released.

Similarly to the general state of the art described above, the method has the shortcoming that it uses values with the air mass flow which on the one hand can be measured only with difficulty and not overly reliably and which on the other hand are admittedly indicators that the fuel cell is again stressable, but do not reflect this condition with certainty. Consequently, there is also the risk that in spite of stable values a voltage interruption crops up for an according load of the fuel cell.

The object of the present invention is then to provide a method for starting an electrical system with fuel cell and converter from a stop mode, which avoids these shortcomings and guarantees quite simply and reliably that the fuel cell works safely and reliably once the restart has been released under normal conditions.

In the method according to the invention, the interrupted reactant supply is conducted as in the state of the art, from a restart signal and a fuel cell voltage is prescribed, which is regulated accordingly by the transducer. It is provided according to the invention that the prescribed fuel cell voltage is prescribed in such a way that an electrical unloaded fuel cell supplied with reactants will exceed the prescribed fuel cell voltage in every case. It is also provided that the current of the transducer necessary for maintaining the prescribed fuel cell voltage is measured after which the normal operation is released as of a prescribed current necessary to that effect. The method according to the invention also uses an upper limit for a fuel cell voltage which is prescribed in such a way that the voltage is below the idle voltage of a functional fuel cell supplied with reactants. In particular, the prescribed fuel cell voltage can be preset in such a way that critical corrosion effects at their catalysts are avoided in terms of lifetime of the fuel cell. Current is drawn from the fuel cell via the transducer so as to maintain the voltage delivered by the fuel cell below the prescribed threshold, at the start of the reactant supply of the fuel cell. As soon as the current drawn and measured at the transducer reaches a preset value, which is necessary to maintain the current voltage at or below the prescribed voltage, the fuel cell should be stressable again. Once the prescribed current has been reached, the normal operation of the fuel cell is released, without having to fear shortcomings as regards the operation, in particular a voltage interruption due to an early load of the fuel cell after starting.

In a very advantageous further development of the idea of the invention it is moreover provided that the prescribed necessary current is preset approximately at half the average current typically cropping up at the upper voltage limit. Once such an amperage of the fuel cell has been reached, which corresponds approximately to half the average current cropping up typically in normal operation, the performance of the fuel cell is, to the best of the inventor's knowledge, unrestricted, so that the fuel cell is loaded accordingly and the normal operation can be released after restarting the fuel cell.

The fuel cell can be designed as a pile of individual cells, as generally known and normal. In an advantageous further development of the method according to the invention it is provided that the prescribed fuel cell voltage is preset with 800-900 mV, preferably 850 mV, per individual cell of the fuel cell pile. Such a voltage value in the order of magnitude of 800-900 mV per individual cell is ideal to guarantee on the one hand the operation of the fuel cell safely and reliably and on the other hand to minimize corrosion effects caused by higher voltages, whereas longer lifetime of the fuel cell can be reached.

According to a very favorable further embodiment of the method according to the invention, it can therefore be provided that the prescribed current related to the active cell face, from which the normal operation is released, is prescribed between 0.02 and 0.05 A/cm$^2$, preferably between 0.03 and 0.04 A/cm$^2$. Such a current value of 0.035 A/cm$^2$ for example, has proven as ideal according to the experience and experiments of the inventor. The normal operation of the electrical system can thus be released as soon as it happens to maintain the voltage of the fuel cell at or below the prescribed voltage.

In a favorable embodiment of the method of the invention it is thus provided that the oxygen supply of the fuel cell is interrupted in stop mode, which oxygen supply can be realized by supplying the fuel cell with air. Such interruption of the oxygen supply, ideally when maintaining the hydrogen supply of the fuel cell, the requirement for the stop mode is ideal since the air supply device, comparatively energy-intensive and noise-emitting, is stopped or can be brought into idle mode, so that energy can be saved and emissions can be avoided in stop mode. If for instance a flow compressor is used as a pneumatic feeding machine, an idle rotational speed is ideally meaningful during stop mode, since it guarantees a very quick restart. Any postflowing compressed air can be blown out in such a case for instance via an additional valve so that the air is not guided into the fuel cell, so that no electrical power on the one hand is generated and the fuel cell is not dried out in stop mode on the other hand.

The method according to the invention is now ideal for electrical systems composed of fuel cell and the transducer, in particular fuel cell systems with a transducer, which are often operated in stop mode, for example to reduce energy consumption and emissions in phases, in which there is no power requirement or only a small one. Resorting to such start and stop strategies in particular meaningful with vehicles so that the preferred usage of the method according to the invention sets forth that the electrical system is used to provide driving power for a vehicle.

Further advantageous embodiments of the method according to the invention can be derived from the remaining dependent sub-claims and which are described more in detail below in the light of the exemplary embodiment and with reference to the figures.

DETAILED DESCRIPTION OF THE DRAWINGS

Figure 1:
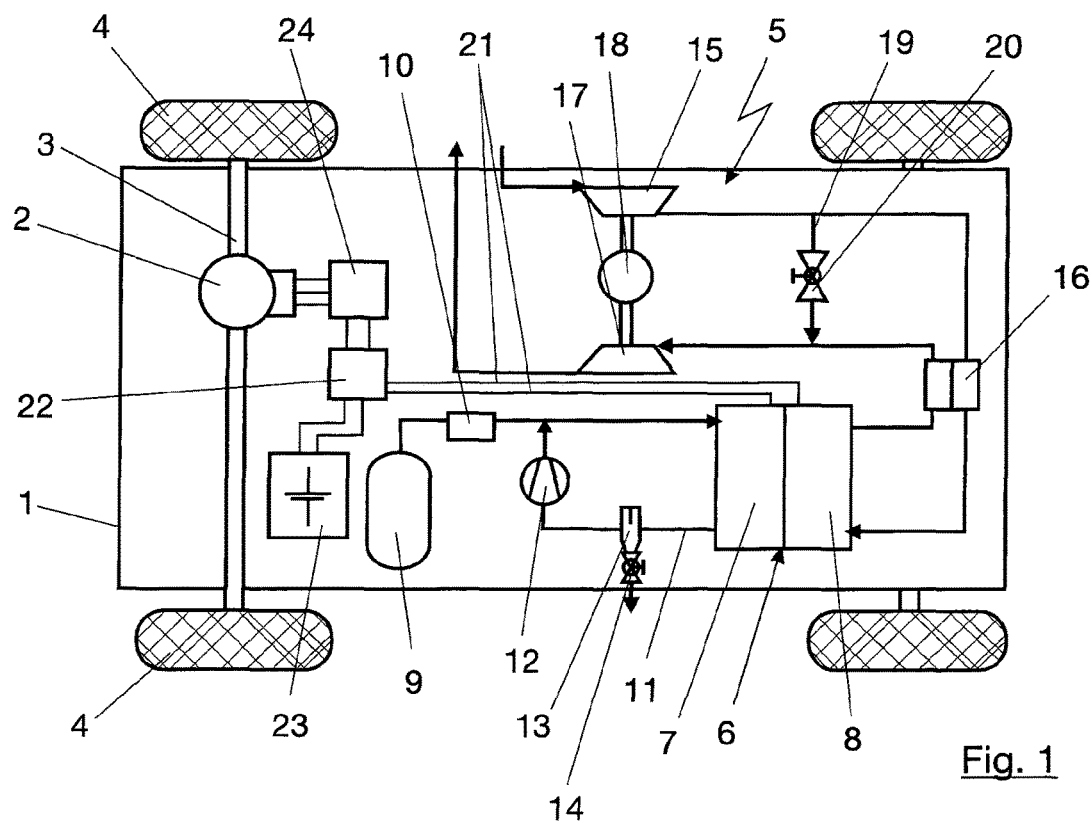
FIG. 1 shows a vehicle indicated as a matter of principle with a fuel cell system.

The illustration of FIG. 1 shows an implicitly indicated vehicle 1, which must be driven via an electrical travelling motor 2. The electrical travelling motor 2 drives in the representation illustrated here purely by way of example two drive wheels of the vehicle 1 designated with 4 and connected via a driven shaft 3. The electrical power for driving the vehicle 1 is delivered by an electrical system in the form of a fuel cell system 5. The fuel cell system 5 is indicated in the general normal and preferred form of embodiment represented here, purely by way of example. The core of the fuel cell system 5 consequently consists of a fuel cell 6 which is built-up typically as a pile of individual cells, as a so-called fuel cell pile or fuel cell stack. This fuel cell stack includes an anode side and a cathode side whereas a common anode chamber 7 and a common cathode chamber 8 are shown purely by way of example in the representation of FIG. 1. The anode chamber 7 is supplied with hydrogen from a compressed gas reservoir 9 via a pressure regulating and dosing unit 10. Non-consumed hydrogen returns in a manner known per se via a recirculation pipe 11 with a recirculation supply device 12 and is fed to the anode chamber 7 mixed with fresh hydrogen. The assembly is also designated as an anode circuit. Complementary and alternate to the recirculation supply device 12 illustrated as a blower, a gas jet pump could also be envisioned where the jet pump is driven by the fresh hydrogen gas from the compressed gas reservoir 9. To be able to discharge enriched water and enriched inert gases in the anode circuit from time to time, the recirculation pipe 11 moreover includes a water separator 13 with an exhaust valve 14. The assembly and its operating strategy are the known from the general state of the art so that it is not necessary to go into further details.

The cathode chamber 8 of the fuel cell 6 is supplied with air via a pneumatic feeding machine 15 as an oxygen supplier. The air thus flows into the cathode chamber 8 via an optional humidifier 16 in which it is humidified. Humid exhaust air, depleted of oxygen, leaves the cathode chamber 8 and flows back via the optional humidifier 16, so as to discharge the humidity comprised therein, at least partially to the air intake. It then flows into the surrounding atmosphere through a turbine 17. The turbine 17 forms together with an electrical machine 18 and the pneumatic feeding machine 15 a so-called electrical turbo charger which is designed for the best energy-efficient air supply of the fuel cell 6. The outlet of the pneumatic feeding machine 15 and the inlet to the turbine 17 can again be connected together via a system bypass 19 with a system bypass valve 20, so that the system bypass valve 20 can be open in certain situations so as to avoid or to limit the ingress of air into the cathode chamber 8, even if the pneumatic feeding machine 15 is still running. This can be the case due to a very high rotational speed shown by the pneumatic feeding machine designed as a flow compressor in regular operation, when in overrun.

The electrical power of the fuel cell 6 is received by a transducer 22 via the electrical lines 21 suggested here. The transducer 22 which can be designed by way of example as a DC/DC-converter or as a battery converter. The converter is in contact with an optional high volt battery 23 as an electrical energy storage device. It is moreover in contact with further power electronics 24, by way of example a DC/AC converter which is formed to provide driving power for at least the travelling motor 2.

Such a fuel cell system 5 in a vehicle 1 is now often driven in such a way that it is used with a so-called start-stop strategy. If the vehicle 1 does not require, or hardly, any driving power which can be made available without any problems via the battery 23, for example when the vehicle is driving uphill and is stopped at a red light, then the fuel cell system 5 is switched into a so-called stop mode to save energy and to reduce the emissions of noise in these stop phases.

Figure 2:
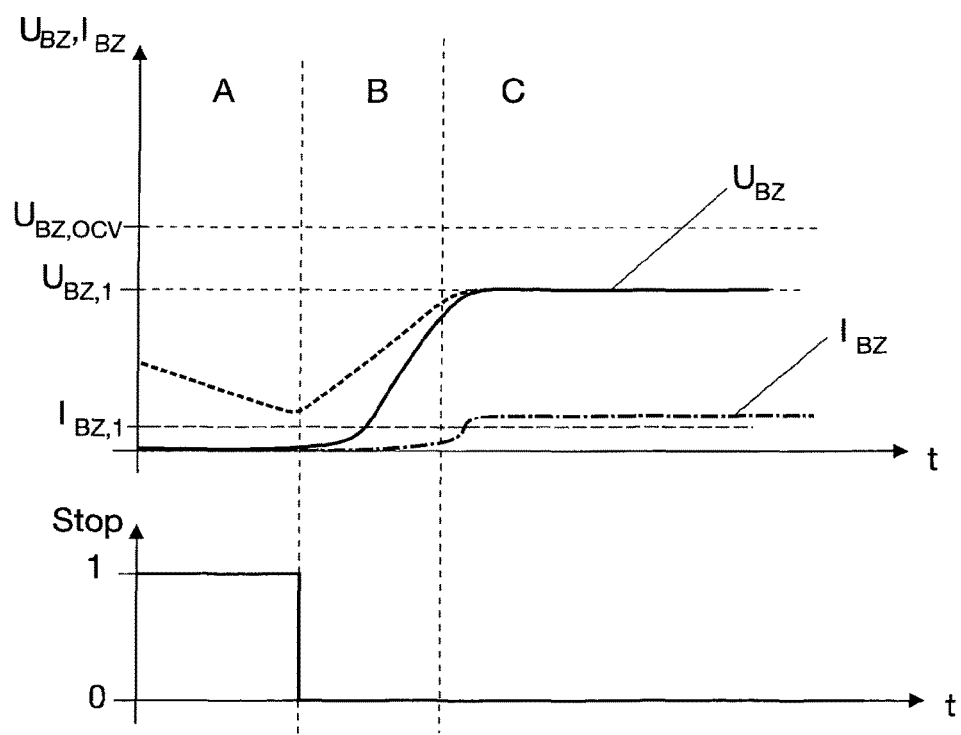
FIG. 2 shows a diagram with signal curves when starting the normal operation of such a fuel cell system from a stop mode.

Typically, the air supply of the fuel cell 6 is to do so interrupted while the hydrogen supply continues at reduced level. The residual oxygen in the fuel cell 6 then reacts with the still present hydrogen at least partially, according to the length of the stop phase so that the fuel cell voltage $U_{BZ}$ falls to zero at least after a certain time t. This is suggested accordingly in the right-hand section designated with A, in the top diagram of FIG. 2, which shows the voltage $U_{BZ}$ and the current $I_{BZ}$ of the fuel cell 6 over the time period t. The voltage $U_{BZ}$ is hence illustrated with a solid line in section A at "zero". The alternative dotted representation, at which the stop phase has not lasted as long, shows the still persisting drop of voltage almost to zero up to the end of phase A. The diagram represents the condition of the stop mode below the diagram with voltage U and current I. The condition is set on one in the area A, the fuel cell system 5 is thus in stop mode. The requirement of the stop mode changes from one to zero when switching from area A to area B, which at the end of the day corresponds to a restart signal for the fuel cell system 5.

Accordingly, the interrupted air supply is resumed and the fuel cell 6 supplied with air increasingly. Simultaneously, a fuel cell voltage $U_{BZ,1}$ is prescribed, which is slightly lower than the idle voltage $U_{OCV}$ of the supplied fuel cell 6. The voltage, which for example is in the order of magnitude of 850 mV per individual cell of the fuel cell 6, is regulated accordingly by the transducer 22 inasmuch as it draws the current $I_{BZ}$, represented by the "dash-dotted" line from the fuel cell 6. In order to maintain the fuel cell voltage $U_{BZ}$ at or below the prescribed voltage value $U_{BZ,1}$, the current must rise accordingly as the supply of the fuel cell 6 with oxygen and hydrogen increases. Should the fuel cell current $I_{BZ}$ increases above a prescribed value $I_{BZ,1}$, the system switches from restart operation B into normal operation C of the fuel cell 6, in which current $I_{BZ}$ and voltage $U_{BZ}$ are adjusted by the vehicle 1 according to the power requirements.

Typically, a fuel cell current $I_{BZ}$ of approx. 10 A as an average current $I_{BZ}$ during normal operation can take place with a fuel cell 6 composed of approx. 350-500 individual cells. The prescribed current value $1_{BZ,1}$ as of which the normal operation C is released again is set more or less at half the value, i.e., around 5 A, which corresponds to a current density of around 0.035 A/cm².

As soon as the fuel cell current $I_{BZ}$, which is necessary to maintain the fuel cell voltage $U_{BZ}$ below the prescribed voltage $U_{BZ,1}$, exceeds the prescribed current value $1_{BZ,1}$, the complete performance of the fuel cell system 5 is again available so that the normal operation C can be released. No voltage interruption is expected any longer when the fuel cell 6 is subjected to higher stress so that safe and reliable release of the normal operation is possible via simple current measurement.

The invention claimed is:

1. A method for determining a start of a normal operation of an electrical system with a fuel cell and a transducer from a stop mode, comprising the steps of:
   receiving electrical power of the fuel cell by the transducer;
   interrupting a supply of reactant to the fuel cell;
   resuming the interrupted supply of reactant from a restart signal; and
   prescribing and regulating a fuel cell voltage by the transducer;
   wherein the prescribed fuel cell voltage is prescribed such that an electrical unloaded fuel cell supplied with reactants will exceed the prescribed fuel cell voltage, wherein the normal operation is determined to be started when a fuel cell current increases above a prescribed fuel cell current, and wherein the prescribed fuel cell current is set as approximately half an average fuel cell current in the normal operation at the prescribed fuel cell voltage.

2. The method according to claim 1, wherein the fuel cell consists of a pile of individual cells.

3. The method according to claim 2, wherein the prescribed fuel cell voltage is 800-900 mV per individual cell.

4. The method according to claim 1, wherein the transducer is a DC/DC-converter or a battery converter.

5. The method according to claim 1, wherein the step of interrupting is performed in the stop mode.

6. The method according to claim 1, wherein the reactant is air.

7. The method according to claim 1, wherein the electrical system supplies driving power for a vehicle.

8. A method for determining a start of a normal operation of an electrical system with a fuel cell and a transducer from a stop mode, comprising the steps of:
   receiving electrical power of the fuel cell by the transducer;
   interrupting a supply of reactant to the fuel cell;
   resuming the interrupted supply of reactant from a restart signal; and
   prescribing and regulating a fuel cell voltage by the transducer;
   wherein the prescribed fuel cell voltage is prescribed such that an electrical unloaded fuel cell supplied with reactants will exceed the prescribed fuel cell voltage, wherein the normal operation is determined to be started when a fuel cell current increases above a prescribed fuel cell current, and wherein the prescribed fuel cell current is between 0.02 and 0.05 A/cm².

* * * * *